US008886430B2

(12) United States Patent
Vollert et al.

(10) Patent No.: US 8,886,430 B2
(45) Date of Patent: Nov. 11, 2014

(54) METHOD FOR OPERATING A BRAKE-BOOSTED BRAKE SYSTEM OF A VEHICLE, AND CONTROL DEVICE FOR A BRAKE-BOOSTED BRAKE SYSTEM OF A VEHICLE

(75) Inventors: Herbert Vollert, Vaihingen/Enz (DE); Frank Kneip, Bruchmuhlbach-Miesau (DE); Dirk Mahnkopf, Eglosheim (DE)

(73) Assignee: Robert Bosch GmbH, Stuttgart (DE)

( * ) Notice: Subject to any disclaimer, the term of this patent is extended or adjusted under 35 U.S.C. 154(b) by 137 days.

(21) Appl. No.: 13/500,982

(22) PCT Filed: Aug. 11, 2010

(86) PCT No.: PCT/EP2010/061699
§ 371 (c)(1),
(2), (4) Date: Jun. 26, 2012

(87) PCT Pub. No.: WO2011/042238
PCT Pub. Date: Apr. 14, 2011

(65) Prior Publication Data
US 2012/0265417 A1    Oct. 18, 2012

(30) Foreign Application Priority Data
Oct. 7, 2009   (DE) .......................... 10 2009 045 415

(51) Int. Cl.
*G06F 7/70*    (2006.01)
*G06F 19/00*   (2011.01)
(Continued)

(52) U.S. Cl.
CPC .................................. *B60T 13/745* (2013.01)
USPC ..................... 701/70; 701/71; 60/533; 60/545

(58) Field of Classification Search
CPC ........... B60T 13/745; B60T 1/08; B60T 8/34; B60T 8/17; F15B 13/16; F15B 21/00; F15B 7/08; F15B 13/00; F04B 49/007; F04B 2201/1204; F04B 49/08; F04B 49/002
USPC ................ 60/545, 581, 533, 445, 447; 303/3, 303/9.75, 122.9, 114.1, 113.1, 115.4; 701/77, 22, 51, 70
See application file for complete search history.

(56) References Cited

U.S. PATENT DOCUMENTS 5,001,640 A * 3/1991 Matsumoto et al. ............ 701/77
7,523,812 B2   4/2009 Thibault et al.
(Continued)

FOREIGN PATENT DOCUMENTS

WO    2004110840    12/2004

OTHER PUBLICATIONS

PCT/EP2010/061699 International Search Report dated Mar. 11, 2011 (Translation and Original, 4 pages).

*Primary Examiner* — Calvin Cheung
*Assistant Examiner* — Luis A Martinez Borrero
(74) *Attorney, Agent, or Firm* — Michael Best & Friedrich LLP

(57) ABSTRACT

The invention relates to a method for operating a brake-boosted brake system of a vehicle, comprising the following steps: determining braking force information (28) with respect to a driver braking force (Ff), which is applied to the actuating element (10) when an actuating element (10) of the brake system is actuated by a driver of the vehicle; determining an actual speed parameter (34) with respect to an adjustment speed of a servo piston (16) of the brake system to which a servo power (Fu) of a brake booster (14) of the brake system is applied; determining a relative speed parameter (40) with respect to a relative speed of the servo piston (16) relative to the input piston (12); establishing a target speed parameter (50) with respect to the adjustment speed of the servo piston (16) taking into account the determined braking force information (28), the determined actual speed parameter (34) and the determined relative speed parameter (40), and actuating the brake booster (14) taking the established target speed parameter (50) into account. The invention further relates to a control device (24) and to a brake booster (14) for a brake-boosted brake system of a vehicle, and to a brake-boosted brake system for a vehicle.

15 Claims, 5 Drawing Sheets

(51) Int. Cl.
 *G06G 7/00* (2006.01)
 *G06G 7/76* (2006.01)
 *B60T 13/74* (2006.01)

(56) References Cited

U.S. PATENT DOCUMENTS

| | | | |
|---|---|---|---|
| 2002/0008426 A1* | 1/2002 | Isono | 303/115.4 |
| 2003/0234127 A1* | 12/2003 | Sudou et al. | 180/170 |
| 2004/0054450 A1* | 3/2004 | Nakamura et al. | 701/22 |
| 2004/0227396 A1* | 11/2004 | Kusano | 303/113.1 |
| 2006/0237247 A1* | 10/2006 | Severinsky et al. | 180/65.4 |
| 2008/0059031 A1* | 3/2008 | Yasui | 701/51 |
| 2008/0185241 A1* | 8/2008 | Isono et al. | 188/151 R |
| 2008/0210499 A1* | 9/2008 | Isono et al. | 188/72.4 |
| 2008/0229741 A1* | 9/2008 | Isono et al. | 60/581 |
| 2008/0295512 A1* | 12/2008 | Obata et al. | 60/545 |
| 2009/0039702 A1* | 2/2009 | Nishino et al. | 303/114.1 |
| 2009/0115242 A1 | 5/2009 | Ohtani et al. | |
| 2009/0127929 A1* | 5/2009 | Sawada et al. | 303/122.09 |
| 2009/0177345 A1* | 7/2009 | Severinsky et al. | 701/22 |
| 2010/0026083 A1* | 2/2010 | Leiber et al. | 303/3 |
| 2010/0212314 A1* | 8/2010 | Isono | 60/545 |
| 2010/0269683 A1* | 10/2010 | Anderson et al. | 91/369.1 |
| 2010/0283315 A1* | 11/2010 | Isono | 303/9.75 |

* cited by examiner

METHOD FOR OPERATING A BRAKE-BOOSTED BRAKE SYSTEM OF A VEHICLE, AND CONTROL DEVICE FOR A BRAKE-BOOSTED BRAKE SYSTEM OF A VEHICLE

BACKGROUND OF THE INVENTION

The invention relates to a method for operating a brake-boosted brake system of a vehicle. The invention further relates to a control device for a brake-boosted brake system of a vehicle. In addition, the invention relates to a brake booster and a brake-boosted brake system.

In order to facilitate a comfortable actuation of an actuating element of a brake system by a driver of a vehicle, as, for example, a brake pedal, a brake system normally comprises a brake booster. The brake booster is designed to provide a servo power, which brings about the deceleration of at least one wheel in addition to a driver braking force provided by the driver of the vehicle by means of actuating the actuating element.

In the German patent publication DE 103 27 553 A1, an electromechanical brake booster is, for example, described, which is designed to measure a driver braking force, which is applied to a piston rod connected to the master brake cylinder when the brake pedal is actuated, and to apply an additional booster force to said master brake cylinder while taking the measured driver braking force into account. The amount of booster force applied by means of the electromechanical brake booster can also be established by taking a pedal speed of the brake pedal into account.

SUMMARY OF THE INVENTION

The invention creates a method for operating a brake-boosted brake system of a vehicle, and a control device for a brake-boosted brake system of a vehicle.

The present invention is based on the knowledge that an actual speed parameter with respect to an adjustment speed of the servo piston of the brake system and a relative speed parameter with respect to the relative speed of the servo piston relative to the input piston contain at least one item of information about a current state of the at least one brake circuit of the brake-boosted brake system.

Furthermore, the present invention is based on the knowledge that it is advantageous to take the actual speed parameter and the relative speed parameter into account when actuating the brake booster. By establishing the target speed parameter with respect to the adjustment speed of the servo piston while additionally taking the determined actual speed parameter and the determined relative speed parameter into account, it is possible to maintain or ensure a preferred position of the input piston, for example, a standard position contingent on the driver braking force, despite a change of state due to temperature, a change of state due to aging and/or a change in function/activation of at least one hydraulic device of the at least one brake circuit. By a standard position contingent on the driver braking force, a position of the input piston is understood, which only changes in the case of a change in the driver braking force applied; however, hardly changes due to a temperature related change in state in a non-extreme value domain, a change in state due to aging, in which the substantial working order of the brake system is still ensured, and/or a change in function/activation of at least one hydraulic device. A preferred position and/or an improved operation of the actuating element can also accordingly be maintained or respectively implemented. Despite a change in state due to temperature and/or a change in state due to aging of the at least one brake circuit, the driver is consequently not disturbed by a change in the behavior of the actuating element. Likewise, the driver does not notice any backlash, in particular any recoil, when activating or deactivating the at least one hydraulic device of the at least one brake circuit. Hence, an improved ease of use of said actuating element is achieved for the driver.

The actuating element of the brake system can, for example, be a brake pedal. With regard to the input piston, a device is understood for mechanically/hydraulically coupling the actuating element to a force/pressure conversion element. Respectively in the case of the servo piston, a device is understood for mechanically/hydraulically coupling the brake booster to the force/pressure conversion element. The present invention is therefore not limited to a design of the input piston and/or the servo piston in a strict sense. Said input piston and/or the servo piston are preferably designed such that they facilitate a direct braking of the driver in at least one brake circuit of his vehicle via the force/pressure conversion element. A device for hydraulically transmitting force can also particularly be understood with regard to the input piston and/or the servo piston.

The force/pressure conversion element is, for example, a master brake cylinder, to which at least one brake circuit is connected. Each of these brake circuits can comprise at least one wheel brake cylinder, via which an associated wheel of the vehicle can be decelerated.

The input piston and the servo piston can be coupled to the force/pressure conversion element via at least one coupling element. The coupling element is preferably a resilient element as, for example, a reaction disk. The present invention is, however, is not limited to a design of the coupling element as a resilient reaction disk. Said reaction disk can also for example be rigid.

An output piston can be disposed between the reaction disk and the force/pressure conversion element as, for example, a master brake cylinder. By the term output piston, a device for mechanically/hydraulically coupling the force/pressure conversion element to the master brake cylinder is thereby understood. Said output piston is therefore not limited to a piston in the narrower sense of the term.

A direct measuring of the relative speed parameter is understood by determining the relative speed parameter with respect to the relative speed of the servo piston relative to the input piston. Said relative speed parameter is therefore preferably not established on the basis of a difference between the actual speed parameter with respect to the adjustment speed of the servo piston and a corresponding adjustment speed parameter of the input piston. In a preferred exemplary embodiment, the relative speed parameter can be determined by means of a differential travel sensor. As an alternative or in addition thereto, a curvature of at least one spring device, via which the input piston is connected to the servo piston, can also be evaluated to determine the relative speed parameter. Particularly for this purpose, a bending speed can thereby be determined as the relative speed parameter.

The method, which is subsequently described, for operating the brake-boosted brake system can also be used with the aim of maintaining a preferred target braking torque and at the same time ensuring a preferred standard operation of the actuating element despite an activating and/or deactivating of a non-hydraulic auxiliary braking torque, for example, an additional friction brake and/or a generator torque. Such a use of the method and the advantageous resulting therefrom are explained below in greater detail.

The advantages of the method for operating the brake-boosted brake system can also be realized by means of a relevant control device. The advantages are furthermore ensured using a similarly designed brake booster for a brake-boosted brake system comprising the control device and using a corresponding brake-boosted brake system of a vehicle comprising said control device.

BRIEF DESCRIPTION OF THE DRAWINGS

Further features and advantages of the present invention are explained below with the aid of the figures.

The following are shown.

DETAILED DESCRIPTION

Figure 1A:
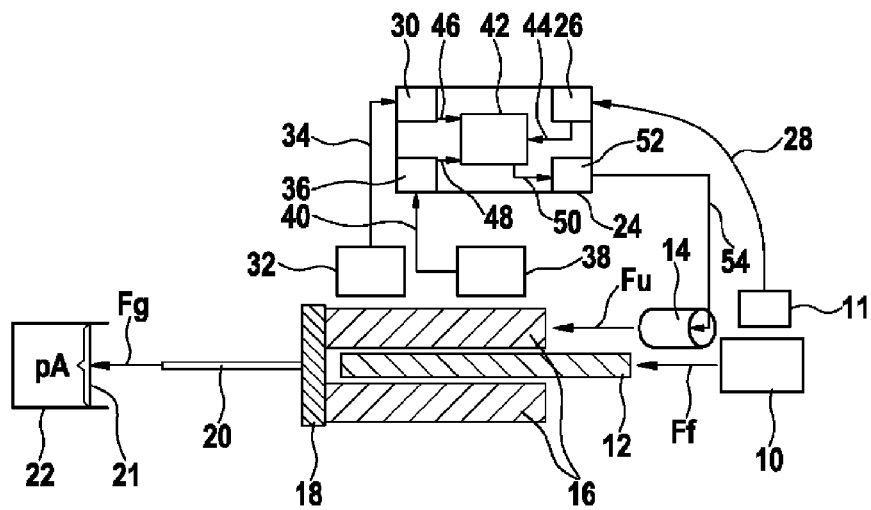
FIGS. 1A to 1C schematic depictions for explaining an operation of a first embodiment of the control device.
Figure 1B:
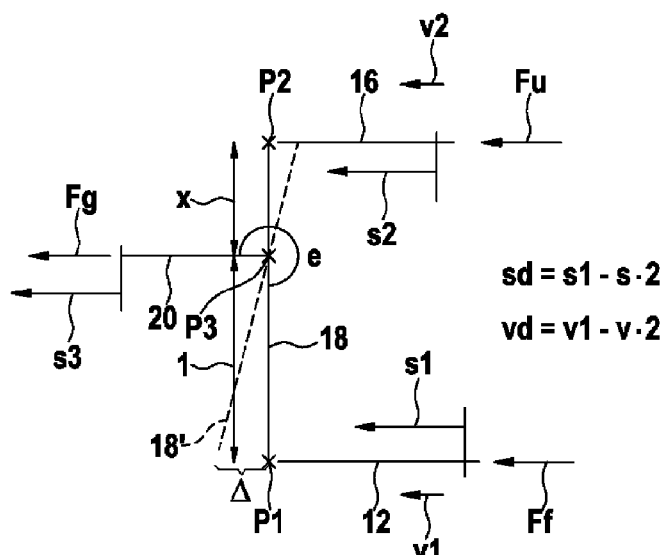
Figure 1C:
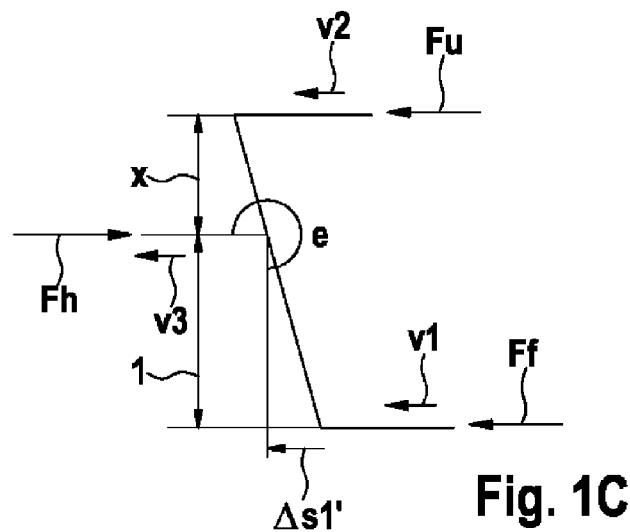

FIGS. 1A to 1C show schematic depictions for explaining an operation of a first embodiment of the control device.

The brake-boosted brake system, which is partially shown in the form of a diagram, comprises an actuating element 10, which, for example, is embodied as a brake pedal. The brake system is, however, not limited to an actuating element 10 embodied as a brake pedal. The driver of the vehicle can apply a driver braking force Ff and a first adjustment travel s1 to a transferring component of the brake system, for example, to an input piston 12 via an actuation of the actuating element 10 (see equivalent circuit diagram in FIG. 1B). In so doing, the input piston 12 is moved at a first adjustment speed v1.

The driver braking force Ff and/or a variable corresponding to said driver braking force Ff can be acquired by means of an actuating element sensor system. The actuating element sensor system can, for example, be disposed on the actuating element 10 or on the input piston 12. In the embodiment depicted, the actuating element sensor system comprises a braking force sensor 11, the operation of which is explained below in more detail.

The brake system comprises at least one brake booster 14. The brake booster 14 is designed to provide a servo power Fu so that the driver does not have to completely apply the force necessary to decelerate his vehicle as driver braking force Ff. Said brake booster 14 can, for example, comprise an electromagnetic actuator, a magnetic actuator and/or an hydraulic system. Said brake booster 14 is not limited to a specific embodiment. Thus, a brake booster 14 which is cost effective and/or which requires less installation space can also be used for the brake system.

The brake booster 14 transfers the servo power Fu and a second adjustment travel s2 to a servo piston 16, which together with the input piston 12 is coupled to a coupling element like the reaction disk 18 depicted. The servo piston 16 can be moved at a second adjustment speed v2 by applying said servo power Fu to said servo piston 16.

In the equivalent circuit diagram of FIG. 1B, the input piston 12 acts on a first point P1 and the servo piston 16 on a second point P2 of the reaction disk 18. The points P1 and P2 thereby correspond to surfaces of said reaction disk 18. In the case of a tubular servo piston 16, the point P2 corresponds, for example, to an annular surface.

The reaction disk 18 can be configured as a force balance, i.e. as a deformable element. The brake system is, however, not limited to the use of a classic reaction disk 18. In place of said reaction disk 18, the brake system can, for example, have another resilient element. The brake system is likewise not restricted to a resilient configuration of said reaction disk 18.

The actuating element 10 and the brake booster 14 are disposed in the brake system in such a way that at least the driver braking force Ff and the servo power Fu bring about a total braking force Fg and a third adjustment travel s3, which can be transferred to a component disposed on the output side of the coupling element, as, for example, to an output piston. The output piston can thereby be moved at a third adjustment speed v3. The output piston 20 contacts the reaction disk 18 at a third point P3, respectively at a corresponding surface. A quotient/area ratio x indicates the ratio of a first distance between the points P2 and P3 to a second distance between the points P3 and P1.

In the case of a resilient reaction disk 18, said disk is deformed at a driver braking force Ff≠0 and/or a servo power Fu≠0, as is depicted by the dashed line in FIG. 1B. The pliability of the reaction disk 18 can be indicated as the elasticity e.

The output piston 20 is coupled to a displaceable component 21 of a force/pressure conversion element, for example, a master brake cylinder 22. At least one (not delineated) brake circuit filled with a braking medium and having at least one wheel brake cylinder is connected to the force/pressure conversion element. A change in the brake pressure in the at least one wheel brake cylinder can decelerate the at least one associated wheel.

At least the driver braking force Ff and the servo power Fu provided by the brake booster 14 yield a total force Fg. In order for the actuating element 10 or rather the input piston 12 to remain in a temporally constant position, the total force Fg corresponds to a counter force Fh (see FIG. 1C) applied by the master brake cylinder 22 onto the output piston 20. Said counter force Fh results from the pressure p in the interior of said master brake cylinder 22, a surface A of the displaceable component 21 of said master brake cylinder 22 and from frictional forces.

The brake system depicted using FIGS. 1A to 1C comprises a control device 24 which is designed to actuate the brake booster 14 such that an advantageous operation and a user friendly position of the actuating element 10 are ensured. As an alternative thereto, the control device 24 can be a subunit of the brake booster 14. Said control device 24 can also be disposed separately from the brake booster 14 in the brake system. Said control device 24 can likewise be embodied with the brake system depicted as a subunit of a central control unit of the vehicle. Designing the brake-boosted brake system to comprise the control device 24 consequently does not require in this case any additional installation space for the brake system.

The embodiment of the control device 24 and the implementable advantages resulting therefrom are explained below in detail.

The control device 24 includes a first receiving unit 26, which is designed to be able to receive an item of braking force information 28 provided by the braking force sensor 11. The braking force information 28 comprises at least one variable/item of information with regard to the actuation of the actuating element 10 by the driver of the motor vehicle. The item of brake force information 28 preferably comprises the driver braking force Ff, which is at least partially transferred to the input piston 12. As an alternative or in addition thereto, the item of braking force information can also comprise a further variable describing said driver braking force Ff.

The first receiving unit 26 can, for example, be a data input. As an alternative thereto, said first receiving unit 26 can also be an internal interface, via which the item of braking force information 28 can be provided by a braking force sensor configured as a subunit of the control device 24.

The control device 24 comprises a second receiving unit 30, said unit being capable of receiving the actual speed parameter 34 with respect to the second adjustment speed v2 of the servo piston 16, which is provided by a first speed sensor 32. The first speed sensor 32 can be configured as a subunit of the control device 24 or externally of said control device 24. The second receiving unit 30 can, for example, be accordingly configured as a data input or as an internal interface.

The actual speed parameter 34 can, for example, comprise the second adjustment speed v2 of the servo piston 16. Another variable, which reflects a temporal change in the position of the servo piston 16, can likewise be understood by said actual speed parameter 34. Said actual speed parameter 34 can, for example, comprise a variable describing the operation of the brake booster 14, for example, an item of information with respect to a temporal change in the position of a component of the brake booster 14.

The first speed sensor 32 can particularly be a component of the sensor system for the open-loop/closed-loop control of the brake booster 14. The position of the motor of the brake booster 14, the (resulting) motor speed, the motor torque thereof and/or the (resulting) servo power Fu are, for example, known by means of said sensor system for the open-loop/closed-loop of said brake booster 14. Said open-loop/closed-loop control of the brake booster 14, which is already present at said brake booster 14, can therefore be used as the first speed sensor 34. A cost effective option of embodiment of the brake-boosted brake system described here is ensured as a result of the multifunctionality of the first speed sensor 34.

The control device 24 additionally comprises a third receiving unit 36. The third receiving unit 36 is coupled to a second speed sensor 38 in such a way that a relative speed parameter 40 provided by the second speed sensor 38 and relating to a relative speed vd of the servo piston 16 relative to the input piston 12 can be received by means of said third receiving unit 36. Said third receiving unit 36 can also be embodied as a data input or as an internal interface. The second speed sensor 38 for ascertaining the relative speed parameter 40 can accordingly be configured as an internal part of the control device 24 or as a part external to said control device 24.

The second speed sensor 38 is preferably designed to measure the relative speed parameter 40 instead of calculating said variable using a difference between the first adjustment speed v1 and the second adjustment speed v2 or a difference of corresponding variables. In a preferred embodiment, the second speed sensor 38 can be embodied as a differential travel sensor. The second speed sensor 38 can, for example, ascertain the relative speed parameter 40 by detecting the curvature of a spring, via which the input piston 12 is connected to the servo piston 14.

An evaluator 42 of the control device 24 is coupled to the receiving units 26, 30, 36 in such a way that relevant data signals 44, 46, 48 from said receiving units 26, 30 and 36 to the evaluator 42 can be provided to the received items of information 28, 34 and 40. Said evaluator 42 is designed in such a way that a target speed parameter 50 with respect to the second adjustment speed v2 of the servo piston 16 can be determined by said evaluator 42 taking into account the received items of information 28, 34 and 40, that is to say the data signals 44 to 48. An advantageous procedural approach for determining the target speed parameter 50 of the second adjustment speed v2 is explained in more detail below. The established target speed parameter 50 is subsequently outputted from the evaluator 42 to a controller 52 of the control device 24.

The controller 52 is designed in such a way that a control signal 54 can be outputted by said controller 52 to the brake booster 14 while taking into account the established target speed parameter 50 of the second adjustment speed v2 of the servo piston 16. Said brake booster 14 is preferably actuated by the control signal 54 such that the servo power Fu applied by said brake booster 14 brings about a second adjustment speed v2 of the servo piston 16 which is equal to the established target speed parameter 50.

On the basis of the items of information 28, 34 and 40 received, the control device 24 can, for example, specify at least one item of information concerning a position/change in position of the reaction disk 18, the displaceable component 21 of the master brake cylinder 22 and/or a state of the brake circuit of the brake system which is coupled to said master brake cylinder 22. Likewise on the basis of said items of information 28, 34 and 40 received by means of the control device 24, an item of information can also be established/determined with respect to a state of said brake circuit due to temperature or ageing and/or with respect to a current operation of at least one hydraulic device or a reaction disk of the at least one brake circuit.

By using/taking into account the items of information 28, 34 and 40 when establishing the target speed parameter 50 of the second adjustment speed v2 of the servo piston 16, the brake booster 14 can be actuated such that a position of the input piston 12, which the driver expects when the driver braking force Ff is currently applied, can be ensured independently of the state due to temperature, the state due to ageing and/or the current operation of the at least one hydraulic device or the reaction disk of the at least one brake circuit. A deviation of the position of said input piston 12 from the standard position corresponding to said driver braking force Ff, as said deviation can occur due to a change in temperature, an ageing of the at least one brake circuit and/or an activation/deactivation of the at least one hydraulic device, can therefore be prevented.

It is possible for the position of the displaceable component 21 of the master brake cylinder 22 not to correspond to the applied driver braking force Ff. The reasons for such a deviation of the position of said displaceable component 21 from a standard position corresponding to said driver braking force Ff can include an extreme ambient temperature around the brake system, a change in state due to the ageing of the at least one brake circuit of the brake system and/or an activation/deactivation of an hydraulic device, as, for example, a pump of the at least one brake circuit.

The deviation of the current position of the displaceable component 21 from the standard position corresponding to the driver braking force Ff can, however, not bring about a deviation of the current position of the input piston 12 from a standard position of the input piston 12 corresponding to said driver braking force Ff. This is due to the control of the brake booster 14 by the control device 24 and thus a deviation, which is irritating to the driver, of the actuating element 10 from the standard position resulting from the driver braking force is also prevented.

Put in other terms, using the determined items of information 28, 34 and 40, a target speed parameter 50 of the second adjustment speed v2 of the servo piston 16 can be established in such a way that a preferred first adjustment speed v1 of the input piston 12 can be maintained. The maintained first adjustment speed v1 of the input piston 12 can ensure that said input piston 12 is held in a standard position corresponding to the driver braking force Ff or is returned to the standard position corresponding to the driver braking force Ff. The brake booster 14 can, for example, be actuated such that the first adjustment speed v1 remains constant despite a change in volume of the at least one brake circuit and/or the master brake cylinder 22.

An advantageous procedural approach to establishing the target speed parameter is discussed below in detail:

For the sake of clarity when describing the advantageous procedural approach, it is assumed that the driver applies a constant driver braking force Ff on the actuating element 10. The applicability of the procedural approach is, however, not restricted to a temporally constant actuation of the actuating element 10 by the driver. On the other hand, said approach can also be used if the driver applies a temporally varying driver braking force Ff to the actuating element 10.

As previously described, the relative speed parameter 40 with respect to a temporal change in a differential travel sd can be acquired using the second speed sensor 38. The differential travel sd is defined by:

$$sd = s1 - s2. \quad (Eq\ 1)$$

The following equation correspondingly applies to a relative speed vd determined on the basis of a temporal change in the differential travel sd:

$$vd = v1 - v2. \quad (Eq\ 2)$$

The kinematics of the brake-boosted brake system are reflected in FIG. 1C on the basis of a correlation of the individual adjustment speeds v1 to v3. In so doing, the following equations apply:

$$v1 = v3 + \Delta s1'\ \text{and} \quad (Eq\ 3)$$

$$v2 = v3 - x \cdot \Delta s1', \quad (Eq\ 4)$$

The following equation results from the difference between the equations (Eq 3) and (Eq 4):

$$v1 - v2 = (1 + x) \cdot \Delta s1' \quad (Eq\ 5)$$

Using the definition in equation (Eq 1), the following equation therefore results:

$$\Delta s1' = \frac{vd}{1+x} \quad (Eq\ 6)$$

The equation (Eq 6) can be used in equation (Eq 4). The following results:

$$v3 = v2 + x \cdot \frac{vd}{1+x} \quad (Eq\ 7)$$

According to the equation (Eq 7), the items of information 34 and 40 provided by the sensors 32 and 38 are suited for establishing the third adjustment speed v3 of the output piston 20. It is therefore not necessary to attach a sensor directly to the output piston 20 in order to determine an item of information with respect to a current position and/or an adjustment movement of said output piston 20. The necessity of attaching such a sensor to the reaction disk 18 or to the displaceable component 21 of the master brake cylinder 22 can accordingly also be omitted.

In addition, it can be seen with the aid of the equation (Eq 7) that an undesirable third adjustment travel s3 and/or a third adjustment movement v3 of the output piston with respect to a position of the input piston 12 can be corrected.

Provided a direct contact exists between the input piston 12 and the reaction disk 18, a correlation between the driver braking force Ff and an adjustment parameter) of the reaction disk 18 can be deduced. As a result, the following equation now applies:

$$sd = s0 + (1+x) \cdot \Delta, \quad (Eq\ 8)$$

wherein the balancing parameter s0 is defined by:

$$s1 = s0 + s3 + \Delta,\ \text{having} \quad (Eq\ 9)$$

$$\Delta = \frac{Ff - x \cdot Fu - (1+x)(F0 + cf \cdot s0)}{e + (1+x)^2 \cdot cf}, \quad (Eq\ 10)$$

wherein F0 is a resilient force and cf is a spring constant of a spring, via which the pistons 12 and 16 are potentially coupled to one another.

A target characteristic curve for the first adjustment travel s1 can be determined or rather established via the aforementioned equations (Eq 8) to (Eq 10). A target characteristic curve can then accordingly be determined or rather established for the first adjustment speed v1. (This is also ensured, provided that the driver does not desire a "constant deceleration", i.e. provided the driver temporally changes the deceleration of the vehicle.

The following equation is then obtained for the first target adjustment speed $v1_S$ of the input piston 12 of the preferred characteristic curve:

$$v1_S = \frac{\partial s1(Ff)}{\partial Ff} \cdot Ff' \quad (Eq\ 11)$$

Analogous to the equations (Eq 3) and (Eq 4), the following equations are now obtained:

$$v1_S = v3 + \Delta s1',\ \text{and} \quad (Eq\ 12)$$

$$v2_S = v3 + x \cdot \Delta s1' \quad (Eq\ 13)$$

The following equation ensues from the equations (Eq 12) and (Eq 13):

$$v2_S = v3(1-x) + x \cdot v1_S \quad (Eq\ 14)$$

The equation (Eq 14) describes an advantageous relation for establishing the target speed parameter 50 of the second adjustment speed v2 of the servo piston. Via the execution of the target adjustment speed parameter 50 established in this way, it can be assured that the input piston 12 is in a standard position specified by the driver braking force Ff despite an extreme ambient temperature, a change in state of the at least one brake circuit and/or the reaction disk due to ageing and/or an activation/deactivation of an hydraulic unit. This considerably improves the ease of use of the actuating element 10.

An advantageous option for application of the control device 24 is explained in detail below.

In the case of the application option described here, a use of the brake-boosted brake system equipped with the control device 24 is based on a vehicle having an auxiliary non-hydraulic brake mechanism. The non-hydraulic brake mechanism is embodied in such a way that a temporally varying, non-hydraulic auxiliary braking torque can be applied to at least one wheel of the vehicle. Said non-hydraulic brake mechanism can, for example, be a generator, with which a vehicle battery can be charged during a braking operation. Even though reference is subsequently made to a vehicle having a generator, the application option is, however, not restricted thereto. Instead of that, a temporally constant vehicle deceleration and good ease in use of the actuating element 10 are also ensured in other exemplary embodiments of the non-hydraulic brake mechanism despite a temporal change in the auxiliary braking torque.

During a braking operation, a sensor device (not illustrated) is designed to determine an actual braking parameter with respect to the auxiliary braking torque. The actual braking parameter is optionally compared with a predetermined target braking parameter by means of a comparator, which is not depicted. For example, it is thereby determined that said actual braking parameter deviates from the target braking parameter by at least one predetermined maximum difference. A downstream evaluation and control unit (not illustrated) is designed to determine a target change in the braking torque while taking the actual braking parameter ascertained into account and/or a comparison of the actual braking parameter ascertained with the predetermined target braking parameter. At least one hydraulic device (not depicted) of at least one brake circuit of the vehicle is subsequently actuated by the evaluation and control unit while taking into account the target change in braking torque, which was previously determined.

The evaluation and control unit is coupled to a sensor device or to the comparator via a fourth receiving unit. The at least one hydraulic device can, for example, be a pump and/or a valve. The actuation of said hydraulic device thereby causes a volume of a braking medium corresponding to the target change in braking torque to be delivered against a force into a storage chamber and/or into the master brake cylinder 22. The force acting against the delivery of the volume of braking medium arises from the total force Fg.

The displacing of the volume of a braking medium into a storage chamber and/or the master brake cylinder 22 can be carried out by an actuator, which is embodied as an hydraulic device of the at least one brake circuit, said hydraulic device being, for example, a component of an ABS system or an ESP system. In other words, the modification of the wheel pressure to keep the total braking torque constant is carried out by an actuator of the ABS system or the ESP system. The reduced wheel pressure in this case leads to a reduced volume uptake of the wheel brake and therefore to the volume of a braking medium flowing back into the master brake cylinder or the storage chamber.

By conveying the volume of a braking medium out of the at least one brake circuit, the maintenance of a temporally constant deceleration, which ensues from the hydraulic braking torque of the brake system and the auxiliary braking torque, can be implemented despite temporal fluctuations in the auxiliary braking torque. The temporally constant vehicle deceleration does not additionally require a modification to the driver braking force Ff applied by the driver to the actuating element 10.

The sensor device, the comparator, the fourth receiving unit and/or the evaluation and control unit can be subunits of the control device 24. They can also be configured on the brake system and or on a central vehicle control system spaced apart from said control device 24.

The application option can be carried out by means of a cost effective and simply constructed brake system. A complicated auxiliary sensor system is not required to carry out the application option. A mechanical coupling between the actuating element 10 and the master brake cylinder 22 does not compromise said application option. It is thereby ensured that the driver can directly brake into the at least one brake circuit in the event of a malfunction of the brake booster 14. This feature improves the safety of the brake system.

The control device 24 additionally ensures that the pulsating volumetric flow is compensated by the "withdrawal" of the brake booster 14 described above. The pump must therefore provide only a small amount of pump pressure so that the actuating element 10 is prevented from thrusting backwards. At the same time, the displacement of the displaceable component 21 resulting from the displaced volume of a braking medium is compensated. A preferred characteristic curve for the position of the input piston 12 can thus be adhered to despite the displaced volume of a braking medium.

The procedural approach described in the preceding paragraphs is advantageous for blending an activated auxiliary braking torque or for blending a deactivated auxiliary braking torque. In a similar manner, further influences on the brake circuit as, for example, a temperature influence on the brake fluid and/or a change due to ageing of at least one component of the brake circuit or the brake booster can be compensated.

The auxiliary braking torque can be completely blended out in the previously described manner. At the same time, the control device 24 facilitates the blocking out of a return vibration on the actuating element 10 as a result of an adjustment movement of the displaceable component 21 of the master brake cylinder. In so doing, a generator torque of a regenerative brake system can be switched on without the driver being aware of this. Brake pedal travel and vehicle deceleration are not influenced by the generator torque being switched on. In addition, a determination of the required braking force resulting from the gradient of the road and the braking request of the driver is ensured.

As subsequently described in detail in reference to FIG. 5, the control device 24 can also be used as a pedal travel simulator after a closing of an isolation valve between the master brake cylinder and the hydraulic device. This does not require any additional hardware. At the same time, said control device 24 ensures a monitoring of the braking system, or respectively the reaction disk 18, including an in-stop calibration and a compensation of the ageing processes.

Figure 2:
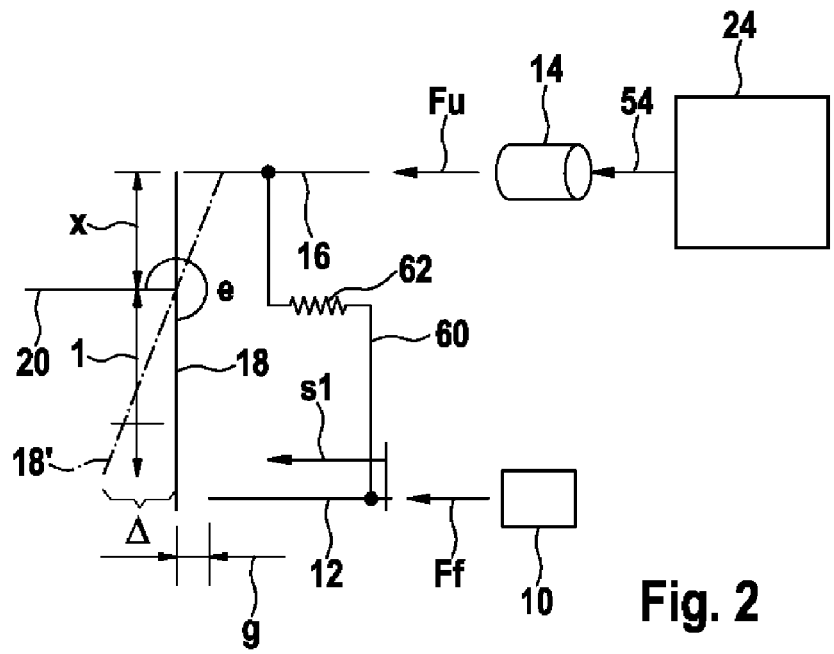
FIG. 2 a schematic depiction of a second embodiment of the control device.

FIG. 2 shows a schematic depiction of a second embodiment of the control device.

The control device 24 schematically illustrated in FIG. 2 has the components of the control device previously described with the aid of FIGS. 1A to 1C. A renewed description of these components is therefore omitted here.

The control device 24 is designed to actuate a brake booster 14, which is inserted into a brake system having a spring coupling 60 between the pistons 12 and 16. The spring coupling 60 comprises at least one spring 62, by means of which the input piston 12 is connected to the servo piston 16.

Due to the spring coupling 60, the brake system depicted can be operated at a comparatively low driver braking force Ff in a first operating mode, in which a distance g≠0 between the reaction disk 18 and the input piston exists. The input piston 12 consequently does not touch the reaction disk 18 in the first operating mode of the brake system. This may also be stated in terms of the brake booster 14 being situated in the "jump-in" state. In the first operating mode of the brake system, the driver braking force Ff is constant because a control in this regard between the pistons 12 and 16 is performed by the spring 62. In this first operating mode, a return vibration of the system on the brake pedal is inhibited during conveyance of a braking medium into the master brake cylinder as a result of the distance g≠0.

In the case of a larger driver braking force Ff, the brake system goes over into a second operating mode, in which g=0. A contact between the input piston 12 and the reaction disk 18 is therefore present in the second operating mode. Due to the use of the control device 24, a reaction to the position of the actuating element 10 is, however, also inhibited in the second operating mode when a volume of a braking medium is displaced into the master brake cylinder.

Figure 3:
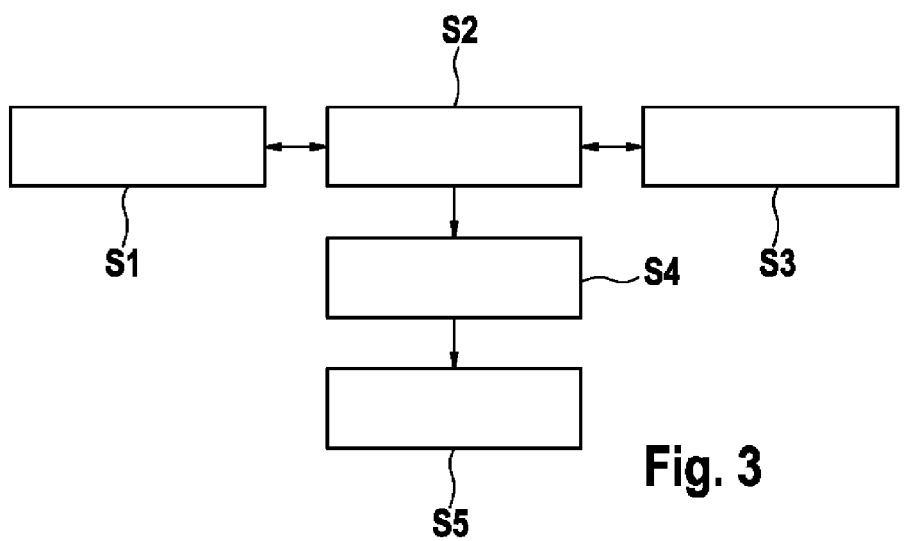
FIG. 3 a flow diagram depicting a first embodiment of the method.

FIG. 3 shows a flow diagram for depicting a first embodiment of the method.

In a procedural step S1, an item of braking force information is determined with respect to a driver braking force. The determined driver braking force is a force which is exerted by the driver of the vehicle on an actuating element when an actuation of said actuating element of the brake system, for example a brake pedal, takes place. In so doing, the driver braking force is at least partially transferred to an input piston of the braking system.

In addition, an actual speed parameter with respect to an adjustment speed of a servo piston of the brake system is determined in a procedural step S2. The servo piston of the brake system is disposed such that a brake booster of the brake system exerts a servo power onto the servo piston. A total force from at least the force transferred to the input piston and the servo power is transmitted to a force/pressure conversion element, for example a master brake cylinder, via a coupling element. A braking pressure can in this way be built up in at least one brake circuit which is connected to the master brake cylinder and comprises at least one wheel brake cylinder. The determined actual speed parameter can comprise, for example, an adjustment speed of the servo piston and/or a rotational and/or an adjustment speed of at least one component of the brake booster.

A relative speed parameter with respect to a relative speed of the servo piston relative to the input piston is furthermore determined. The relative speed parameter is preferably determined by means of a differential travel sensor.

The numbering of the procedural steps S1 to S3 described above does not establish a temporal sequence. On the contrary, said procedural steps S1 to S3 can be carried out in any order and/or at least partially at the same time.

In a subsequent procedural step S4, a target speed parameter with respect to the adjustment speed of the servo piston is established while taking into account the determined braking force information, the determined actual speed parameter and the determined relative speed parameter. For the purpose of establishing the target speed parameter, a target input piston speed parameter can be established while taking into account the determined braking force information. The target speed parameter can subsequently be established while additionally taking into account the established target input piston speed parameter.

The brake booster is actuated in a procedural step S5 while taking into account the established target speed parameter. The actuation of said brake booster preferably takes place in such a way that the servo piston is displaced in compliance with the established target speed parameter.

Advantageous application options for carrying out the method described here are explained below.

Figure 4:
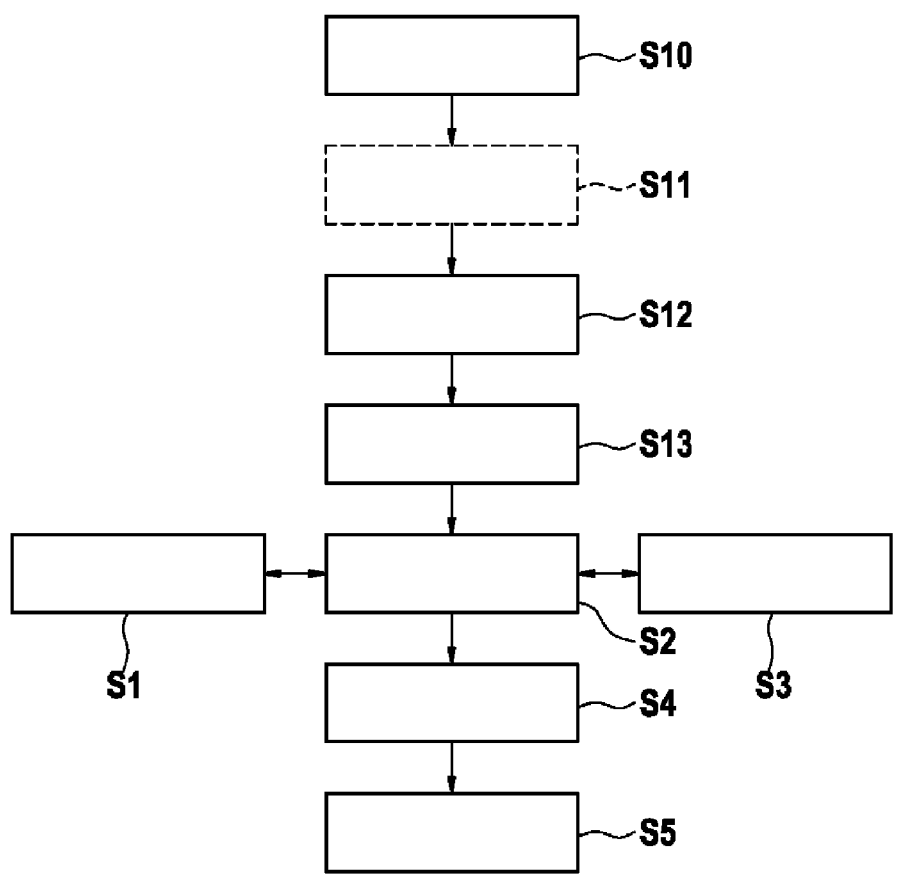
FIG. 4 a flow diagram depicting a second embodiment of the method.

FIG. 4 shows a flow diagram for depicting a second embodiment of the method.

An actual braking parameter with respect to an auxiliary braking torque exerted by a non-hydraulic brake mechanism on at least one wheel of the vehicle is determined in a procedural step S10. The non-hydraulic brake mechanism can, for example, be a generator, with which a vehicle battery is charged during a braking operation. The application option for the method described is, however, not restricted to a vehicle having a generator.

The determined actual braking parameter can comprise the non-hydraulic auxiliary braking torque. As an alternative or in addition thereto, said determined actual braking parameter can also be a total braking torque, which is exerted on at least one wheel of the vehicle. The total braking torque can be a sum of the auxiliary braking torque and an hydraulic braking torque which corresponds to the sum of the driver braking force and the servo power. Said total braking torque can additionally comprise at least one further mechanical braking torque.

In an optional procedural step S11, the determined actual braking parameter can be compared with a predetermined target braking parameter. In procedural step S11, the total braking torque can, for example, be compared as the actual braking torque with a target total braking torque corresponding to the driver braking force. In this way, it can be ensured that the deceleration of the vehicle corresponds to the actuation of the actuating element by the driver despite a change in the auxiliary braking torque during a braking operation. Alternatively, the auxiliary braking torque can itself as the actual braking parameter be compared in the procedural step S11 with a threshold value, which is predetermined as the target braking parameter and from which a blending of the auxiliary braking torque is carried out in the manner subsequently described.

In a procedural step S12, a change in the target braking torque is specified. The specification of the change in the target braking torque takes place while taking into account the determined actual braking parameter or the comparison of the actual braking parameter with the predetermined target braking parameter. Procedural step 12 preferably follows procedural step 11 provided that said actual braking parameter deviates from said target braking parameter by a predetermined maximum difference. The predetermined maximum difference can also be set equal to zero.

Subsequently in a further procedural step S13, a hydraulic device of at least one brake circuit of the vehicle is actuated while taking the established change in the target braking torque into account. The actuation of the hydraulic device causes a volume of a braking medium corresponding to the change in the target braking torque to be delivered against a force into a storage chamber and/or into the master brake cylinder. The actuation of the at least one hydraulic device preferably takes place in such a way that the established change in the target braking torque is carried out. The procedural steps S10 to S13 ensure in this case that the sum of the braking torque applied hydraulically and the auxiliary braking torque remain constant during braking.

The at least one hydraulic device can be a pump and/or a valve of the at least one brake circuit. The at least one hydraulic device can be a component of an ESP system and/or an ABS system of the vehicle. Components already present in the brake system can therefore be used to carry out procedural step S13. Hence, execution of the method described here does not require any additional expensive components for the brake system.

The at least one hydraulic device preferably implements a modification to the wheel pressure in procedural step S13. In the event that a generator torque Mgen, is, for example, established as the change in the target braking torque in procedural step S12, the at least one hydraulic device can change the wheel brake pressure by a differential pressure) p, pursuant to:

$$\Delta p = -\frac{Mgen}{cp} \quad \text{(Eq 15)}$$

wherein the parameter cp is a parameter specific to a wheel brake cylinder. The change in pressure reflected in equation (Eq 15) can be adjusted via the ESP power unit or via the ABS power unit.

The method described in the paragraphs above is primarily advantageous during recuperative braking, in which a portion of the kinetic energy of the vehicle is converted into electric energy. The generator torque, which brings about an additional deceleration of the vehicle, is typically dependent on the speed of the vehicle. Therefore, said generator torque changes during braking Despite the temporally varying generator torque, a constant deceleration of the vehicle is ensured by means of the procedural steps S10 to S13 when the brake pedal is uniformly actuated.

The change in pressure in the at least one brake circuit, which is reflected in equation (Eq 15) can lead to a change in the volume uptake of the master brake cylinder. For example, when the hydraulic braking torque is reduced (when the auxiliary braking torque increases), a volume of a brake medium is initially as a rule pumped back into a storage chamber and subsequently into the master brake cylinder. Correspondingly when the hydraulic braking torque/wheel brake pressure builds up again (when the auxiliary braking torque decreases), a volume of a brake medium is frequently removed from the storage chamber and the master brake cylinder.

In order to prevent the position of the input piston and thereby that of the actuating element from being changed due to the changed volume uptake of the master brake cylinder, the procedural steps S1 to S5 already described with the aid of FIG. 3 can be carried out. After adapting the braking effect/vehicle deceleration in accordance with the temporally varying auxiliary braking torque by procedural steps S10 to S13, it is therefore possible to compensate the effects of the adaptation of the braking effect on a position of the input piston. The volume uptake and/or volume discharge of the master brake cylinder consequently does not change the position of the input piston due to the execution of the procedural steps S1 to S5.

The reactive effect of the changed volume in the master brake cylinder on the position of the input piston can be compensated by the modification to the servo power carried out in the procedural steps S1 to S5. This compensation preferably takes place in such a way that said input piston remains in a position corresponding to the driver braking force despite the volume change in said master brake cylinder. The driver thus neither perceives the blending of the temporally non-constant auxiliary braking torque via a varying vehicle deceleration nor via a change in the position of the actuating element.

The method described in the preceding paragraphs can also be carried out by means of a braking system having a mechanical coupling of the actuating element to the master brake cylinder, which allows the driver to brake directly into the at least one braking circuit and thus offers an improved standard of safety. In addition, the control system for the wheel pressure and the control system for the input piston position are completely decoupled and operations are carried out independently of one another.

Figure 5:
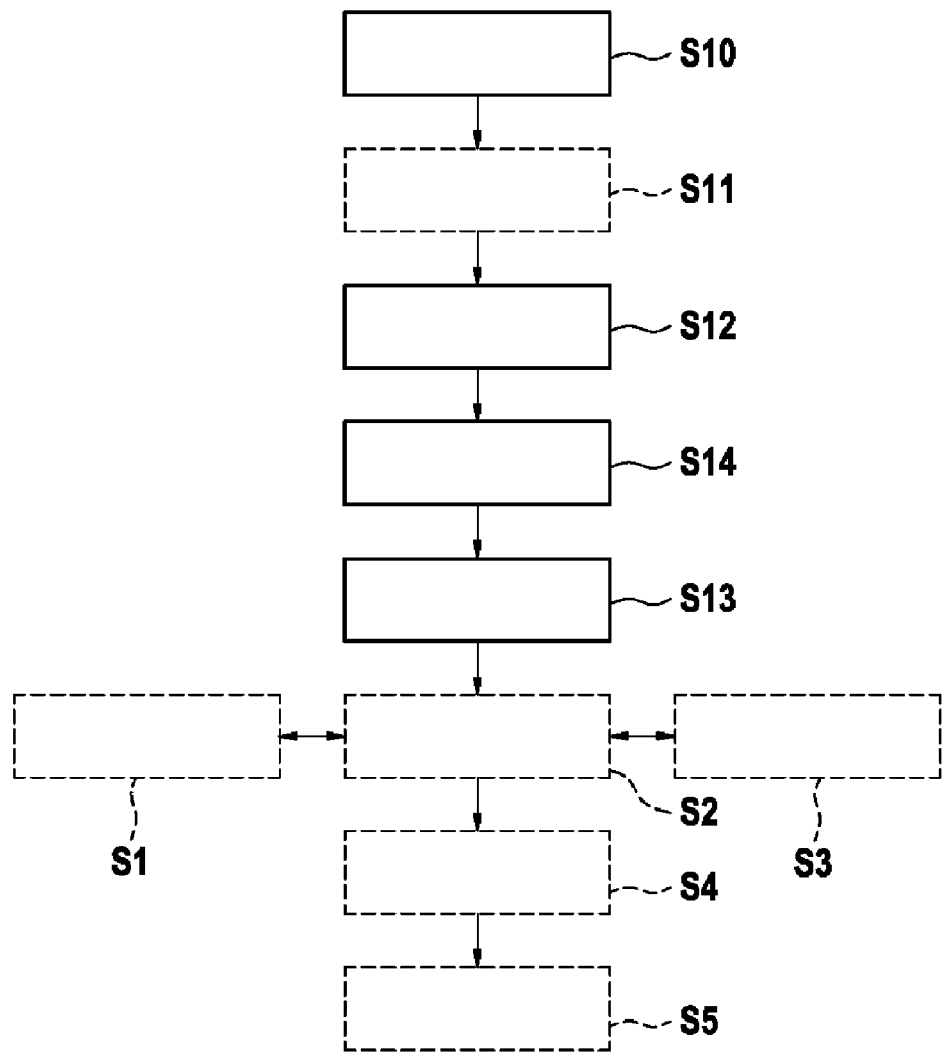
FIG. 5 a flow diagram depicting a third embodiment of the method.

FIG. 5 shows a flow diagram for depicting a third embodiment of the method.

The method comprises the previously described procedural steps S10 to S13. These can be carried out to blend in a temporally varying auxiliary braking torque, which is exerted with an hydraulic braking torque on at least one wheel of the vehicle, by means of a modification to the hydraulic braking torque, for example by using an ESP hydraulic unit or an ABS hydraulic unit. The auxiliary braking torque can, for example, be a generator torque. A renewed execution of the procedural steps S10 to S13 already described above is omitted in this instance.

Prior to or during procedural step S13, at least one valve, which is disposed between the at least one actuated hydraulic device and the master brake cylinder and is subsequently denoted as at least one isolation valve, is closed in a procedural step S14. The at least one isolation valve can, for example, comprise at least one inlet valve. The volume of a braking medium which is displaced for blending the auxiliary braking torque is therefore not displaced into the master brake cylinder but rather into at least one storage chamber.

In a further procedural step, the brake booster can be used as a pedal travel simulator during the closed operational mode of the at least one isolation valve. In so doing, the servo power exerted by the brake booster is established in such a way that the position of the input piston and the actuating element correspond to the driver braking force despite the at least one closed isolation valve. The actuating element can therefore be adjusted by the driver as a matter of routine and can specify a deceleration/braking of the vehicle via the adjustment of the actuating element.

In addition, the reaction disk, the position of which also remains constant when a change in the pressure in the at least one brake circuit occurs, can be used as a counter bearing for the brake booster functioning as a pedal travel simulator. At the same time via the procedural steps S10 to S13, the target brake parameter can be continuously reestablished and reset while taking into account the determined driver braking force. The driver consequently perceives the responsiveness of the actuating element to be normal even during the closed operating mode of the at least one isolation valve.

The procedural steps S1 to S5 can optionally be carried out in order to use the brake booster as a pedal travel simulator when at least one isolation valve is closed. The closing of the at least one isolation valve can be detected via the determined actual speed parameter and the determined relative speed parameter. By taking the two determined parameters and the driver braking force information into account, the target speed parameter can be established such that despite the at least one closed isolation valve, a change in the driver braking force brings about an adjustment movement of the input piston corresponding to said change in the driver braking force.

When using the brake booster as a pedal travel simulator, already known parameters can be brought back in use. An adjustment travel of the input piston corresponds, for example, to a deformation of the reaction disk, which can be provided by a control system of the brake booster. At the same time, the control system for the brake booster normally continuously determines the travel of the motor of said brake booster. A wheel brake pressure can be provided by the ESP system. A driver braking force can be determined by means of a pre-pressure sensor. The option alternatively exists for the driver braking force to be calculated from the servo power and the deflection of the reaction disk by means of a balancing of torques.

The target speed parameter is, for example, established while taking the braking force information, the actual speed parameter and the relative speed parameter into account in such a way that adherence is ensured to a predefined characteristic curve of the position of the input piston when the driver braking force is changed. The target braking parameter can also be a characteristic curve of the driver braking force. The two characteristic curves can be deposited in a memory of a control device.

The invention claimed is:

1. A method for operating a brake-boosted brake system of a vehicle, the method comprising:
   determining, by a controller, braking force information (28) with respect to a driver braking force (Ff) applied to an actuating element (10) by a driver of the vehicle and which is at least partially transferred to an input piston (12) of the brake system (S1); characterized by:
   determining, by a controller, an actual speed parameter (34) with respect to an adjustment speed (v2) of a servo piston (16) of the brake system to which a servo power (Fu) of a brake booster (14) of the brake system is applied (S2);
   determining, by a controller, a relative speed parameter (40) with respect to a relative speed (vd) of the servo piston (16) relative to the input piston (12) (S3);
   establishing, by a controller, a target speed parameter (50) with respect to the adjustment speed (v2) of the servo piston (16) based on the determined braking force information (28), the determined actual speed parameter (34) and the determined relative speed parameter (40) (S4); and
   actuating the brake booster (14) based on the established target speed parameter (50) (S5).

2. The method according to claim 1, wherein in order to establish the target speed parameter (50), a target input piston speed parameter is established based on the determined braking force information (28).

3. The method according to claim 1, wherein the relative speed parameter (40) is determined using a differential travel sensor (32).

4. The method according to claim 1, further comprising:
   determining an actual braking parameter with respect to a non-hydraulic auxiliary braking torque applied to at least one wheel of the vehicle (S10);
   establishing a target change in braking torque based on the determined actual braking parameter or a comparison of said actual braking parameter with a predetermined target braking parameter (S12); and
      actuating at least one hydraulic device of at least one brake circuit of the vehicle based on the established target change in braking torque (S13).

5. The method according to claim 4, wherein at least one hydraulic device of the at least one brake circuit is controlled, based on the established target change in braking torque, such that a volume of a braking medium corresponding to the established target change in braking torque is displaced between the at least one brake circuit and at least one storage chamber of the brake system.

6. The method according to claim 5, wherein at least one valve disposed between the at least one hydraulic device and the master brake cylinder is closed prior to the actuation of said at least one hydraulic device (S14).

7. The method according to claim 5, wherein the at least one hydraulic device includes at least one pump.

8. The method according to claim 5, wherein the at least one hydraulic device includes at least one valve.

9. The method according to claim 5, wherein the at least one storage chamber of the brake system includes a master brake cylinder (22).

10. A control device (24) for a brake-boosted brake system of a vehicle comprising:
    a first receiving unit (26), coupled to a braking force sensor (11), and configured to receive an item of braking force information (28), wherein said item of braking force information is provided by the braking force sensor (11) and is relative to a driver braking force (Ff), provided by a driver of the vehicle when an actuating element (10) of the brake system is actuated and which can be transferred at least partially to an input piston (12) of said brake system; characterized in that
    a second receiving unit (30), coupled to a first speed sensor (32), and configured to receive an actual speed parameter (34) provided by the first speed sensor (32) based on an adjustment speed (v2) of a servo piston (16) of the brake system, to which a servo power (Fu) is applied by a brake booster (14) of said brake system;
    a third receiving unit (36), coupled to a second speed sensor (38), and configured to receive a relative speed parameter (40) provided by the second speed sensor (38) based on a relative speed (vd) of the servo piston (16) relative to the input piston (12);
    an evaluator (42), coupled to the first, second, and third receiving units (26, 30, 36), and configured to establish a target speed parameter (50) with respect to the adjustment speed (v2) of the servo piston (16) based on the braking force information (28) received, the actual speed parameter (34) received and the relative speed parameter (40) received; and
    a controller (52) configured to provide a control signal (54) to the brake booster (14) based on the established target speed parameter (50).

11. The control device (24) according to claim 10, further comprising:
    a fourth receiving unit, configured to receive an actual braking parameter provided by a sensor device based on a non-hydraulic auxiliary braking torque applied to at least one wheel of the vehicle; and
    an evaluation and control unit, configured to establish a target change in the braking torque using the provided actual braking parameter or a comparison of said provided actual braking parameter with a predetermined target braking parameter and further configured to use the established target change in braking torque to control at least one hydraulic device of at least one brake circuit of the vehicle such that a volume of a braking medium corresponding to a target change in braking torque can be displaced between the at least one brake circuit and at least one storage chamber of the brake system.

12. The method according to claim 11, wherein the at least one storage chamber of the brake system includes a master brake cylinder (22).

13. The brake booster (14) for a brake-boosted brake system of a vehicle comprising a control device (24) according to claim 10.

14. The brake-boosted brake system for a vehicle having a brake booster (14) according to claim 13.

15. The brake-boosted brake system for a vehicle having a control device (24) according to claim 10.

* * * * *